Oct. 6, 1936.    J. F. ARCHIBALD    2,056,337
LAWN SPIKER
Filed June 21, 1935
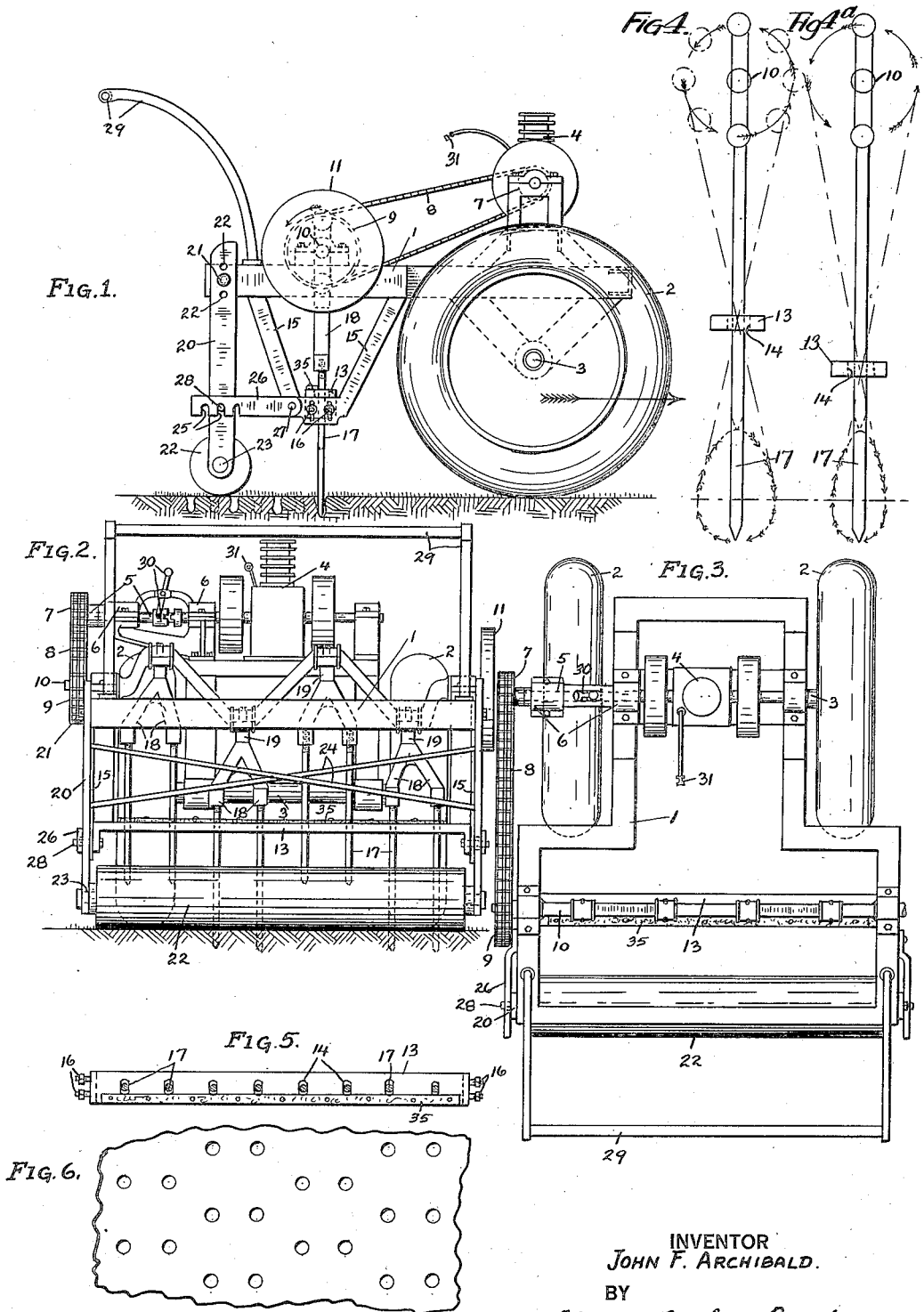
INVENTOR
JOHN F. ARCHIBALD.
BY
Miller Boyken & Bried
ATTORNEY Patented Oct. 6, 1936

2,056,337

UNITED STATES PATENT OFFICE 2,056,337

LAWN SPIKER

John F. Archibald, Redwood City, Calif.

Application June 21, 1935, Serial No. 27,706

9 Claims. (Cl. 97—36)

This invention relates to lawn spikers and has for its objects a device for more quickly and efficiently loosening the earth around the roots of the grass in a lawn than heretofore and for reconditioning lawns generally whereby the roots will be able to receive the proper nourishment and the grass will accordingly be revitalized. Other objects and advantages will appear in the specification and drawing.

In the drawing, Fig. 1 is a side elevation of my device showing the ground in section.

Fig. 2 is a rear view of the device of Fig. 1.

Fig. 3 is a plan view of the device of Fig. 2 with the flywheel on the right-hand side broken away to accommodate the sheet.

Fig. 4 and Fig. 4a are diagrammatic views of the operation of the spikes of my device in two positions of adjustment.

Fig. 5 is a fragmentary plan view of a portion of my device with the spikes shown in section.

Fig. 6 is a view representing a portion of a lawn in plan view showing a general pattern of holes produced by my device.

In the growing of lawns, particularly where it is necessary to regularly sprinkle lawns during a period of many months, as in California, the earth around the roots of the grass becomes tightly packed and gradually the grass dies for lack of nourishment, this condition sometimes commencing in spots and sometimes over the entire lawn, and heretofore attempts to revive the lawn have been by liberal use of fertilizer, but such attempts have only resulted in temporary relief, since the failure of the grass has not been due to sterile earth but to the hard, tightly packed character of the earth around the roots of the grass. Those who have recognized this fact have resorted to going over the lawn with a spading fork manually jabbing it into the lawn, or have merely punched holes in the lawn with various kinds of devices. The manual use of a spading fork not only is a slow, back-breaking procedure, but through lack of proper manipulation and inability to obtain uniformity of results, many times little if any good is accomplished and sometimes actual injury follows. With my device, I am able to uniformly and properly "spike" and roll a lawn within the time it would require a person to rapidly walk over its area, and this without visibly altering the appearance of the lawn at the time, and at the same time, with my device, I am able to recondition any bare spaces in the lawn to enable the base grass to grow over such spaces. After spiking a lawn, it may be sanded, thus filling the holes with sand and thereby preventing re-packing for several years, or it may be fertilized if the ground is sterile, with far better results than if the lawn were not spiked; or the lawn may be left without any further attention, such as sanding or fertilizing, and the grass will quickly regain its normal, healthy condition.

In detail my device comprises a substantially horizontally disposed frame 1 supported on the ground at its forward end for rolling by wheels 2, which wheels include smooth tread pneumatic tires to facilitate turning on the lawn without injury to the grass. An axle 3 on which the wheels are mounted supports the frame. On the forward end of frame 1 is a small gasoline engine 4 with a shaft 5 extending at its end beyond a side of the frame, which shaft is suitably supported in bearings 6. On the outer end of the shaft is a sprocket 7 and a sprocket chain 8 extends from sprocket 7 rearwardly over a sprocket 9 secured on an end of a crank shaft 10 having four cranks disposed horizontally across the rear end of the frame and a flywheel 11 is secured on the opposite end of the crank shaft. Bearings 12 rotatably support the crank shaft at its ends adjacent the sprocket 9 and flywheel respectively.

Rearwardly of the wheels 2 and spaced directly below the axis of the crank shaft is a flat horizontally disposed elongated bar 13 that extends parallel to the axis of the crank shaft. This bar is provided with equally spaced, vertically extending, generally elongated openings 14, said openings being elongated in a direction transversely of the length of the bar. The bar 13 is supported at its ends from frame 1 by brackets 15 and the bar is adjustable vertically at its ends by loosening bolts 16 that extend through vertically extending slots in the lower ends of the brackets respectively, or the bar may be inverted to lie below the lowermost ends of the brackets, the maximum upper and lower positions being generally indicated in Fig. 4.

Extending through the openings 14 are generally vertically extending spikes 17 that are threadedly secured at their upper ends in the lower ends of inverted Y-shaped yokes. In the drawing (Fig. 2) I show four such yokes, each being provided with a spike in each of the pair of arms 18 of each yoke, and the leg 19 of each yoke is rotatably secured at its outer end to each crank of the crank shaft. It will accordingly be seen that upon rotation of the crank shaft to the left, as indicated in Fig. 4, the spikes will be vertically reciprocated and the lower ends of the spikes will describe a generally ovate path of travel with its greatest width at the lower end of the path, or oscillated horizontally.

The depth to which the sharpened lower ends of the spikes will be driven into the earth is determined by raising or lowering the rear end of the frame, which end is provided with depending legs 20 secured to the frame at their upper ends by bolts 21, a vertical row of spaced holes 22 being provided in the upper ends of the legs for raising or lowering the legs, and a horizontal ground roller 22 is rotatably supported at its ends by stub shafts 23 in the lower ends of legs 20. The legs 20 may be cross-braced if desired, as at 24, and for minor variations in height the legs may be pivoted on the bolts 21 and the lower ends locked at the desired angle in vertical notches 25 in the lower edges of side arms 26, which arms are pivoted at one of their ends at 27 to the lower ends of brackets 15 respectively. These side arms in any event serve to secure the leg against swinging when short, outwardly projecting members 28 are engaged in notches 25.

A handle 29 including supporting arms, is attached to the rear ends of frame for guiding the device, and a manually controlled clutch 30 is provided on shaft 5 for disconnecting and connecting the spikes and engine as desired. The engine is, of course, provided with a conventional throttle 31 for controlling its speed.

In the device illustrated there are eight spikes and four oppositely offset cranks and four spike-supporting yokes connected to the cranks. The spikes are equally spaced, being about two inches apart, the outermost spike of each row being aligned rearwardly of the outer side of each of the wheels 2 so as to permit driving the spiker close to trees, shrubs and the like on either side of the machine. The row of spikes may, of course, be offset even more to either one side or the other, if desired, but I prefer an arrangement whereby the weight of the device is fairly well centered in the area between the wheels.

The vertical adjustment of bar 13 provides for "close" spiking, or relatively well spaced spiking, according to conditions encountered. It will be readily seen that alternate pairs of spikes will be successively driven into the lawn to a depth of from one to two inches ordinarily, although in some lawns I increase or shorten this depth by the adjustment of legs 20. The successive driving of the spikes into the lawn and pivotal action at the bar 13 results in both propelling the device over the lawn and properly loosening the earth around the roots of the grass without tearing the lawn. The device is propelled ordinarily in this manner as rapidly as an operator may conveniently walk, and the weight at the rear end of the frame is sufficient to effect a full drive of the spikes without bouncing. The driving of the spikes is facilitated, of course, by reason of the fact that at least half of their down stroke is free of engagement with the lawn, hence they are driven into the ground with much force. The engine being mounted over the axle acts as a sort of counter balance so that the rear end of the device, including the spikes, are easily lifted and the device manually propelled without disconnecting the engine drive if it is desired to roll the device without spiking, and also such lifting of the rear end is sometimes convenient to regulate the depth to which the spikes are driven where the lawn is spotty and it is desirable to merely scratch the surface. In bare patches on the lawn, it is desirable that the ground be broken up to enable the base grass to spread, and this is accomplished by merely holding the device against forward movement.

It will be readily seen that some wear will occur on both the spikes and bar 3, due to the oscillation of the spikes in the holes in the bar. To reduce this wear, I provide a strip 35 of oil absorbent material along the row of holes and spikes, which strip is kept saturated with oil, although even in the absence of such strip and merely by oiling the bearings, the spikes and bar will last for over a year in substantially constant use. However, the spikes are readily replaced by merely screwing them out of the yokes and inserting new ones, and the bar 13 is replaced with equal facility, the spikes and bar being very cheap to make.

Having described my invention, I claim:

1. A portable lawn spiker comprising a frame including ground wheels supporting said frame for normally rolling in one direction on a lawn, a plurality of generally vertically extending spikes arranged and adapted to be driven generally vertically into the lawn and substantially vertically withdrawn therefrom upon vertical reciprocation thereof, means for vertically reciprocating said spikes and means for causing lateral movement of the lower ends of said spikes at the lower end of their stroke in a direction opposite to the normal directional movement of the lawn spiker.

2. A portable lawn spiker comprising a frame including a pair of wheels for supporting said frame for rolling on a lawn, a horizontally extending row of spaced vertically extending spikes, said row extending across the area between said pair of ground wheels, means mounting said spikes for vertical reciprocation of adjacent spikes of the row simultaneously in opposite directions for driving the lower ends of the spikes generally vertically into the lawn upon downward movement of the spikes respectively, one of the spikes on one side of the center of the row being arranged to descend simultaneously with a spike on the opposite side of the row to tend to prevent veering of the spiker during its movement over a lawn.

3. In a construction as defined in claim 2, means for causing horizontal oscillation of the lower ends of spikes about a horizontal axis extending longitudinally of the row during vertical reciprocation of said spikes, the means mounting the spikes for reciprocation and the means for causing said horizontal oscillation being arranged to coact for producing appreciably greater vertical reciprocation than horizontal oscillation of the spikes.

4. In a construction as defined in claim 2, means for causing oscillation of said spikes about a horizontal axis extending longitudinally of the row during vertical reciprocation of said spikes comprising a horizontal bar positioned intermediate opposite ends of the spikes and provided with openings to slidably pass the spikes through the openings, and the means for reciprocating the spikes comprising a crank shaft rotatably supported on said frame and formed with a plurality of oppositely offset cranks, said spikes being rotatably secured at their upper ends respectively to each of said cranks and a power device for rotating said crank shaft, the openings adapted to pass the spikes being positioned closer to the lower ends of the spikes than to the axis of the crank shaft and connection between the spikes and cranks when the spikes are in lowermost position.

5. A lawn spiker comprising a frame including a pair of ground wheels for supporting said frame for rolling on a lawn, a plurality of straight spikes arranged and adapted to be vertically reciprocated for driving them substantially vertically into the lawn at their lower ends, means for so reciprocating said spikes, means for causing a generally horizontal oscillation of the ends of the spikes and means for adjustably regulating the degree of oscillation of said spikes.

6. In a construction as defined in claim 5, a roller positioned adjacent said spikes arranged and adapted to support said spikes in a predetermined position relative to the surface of the lawn for rolling the lawn subsequently to driving the spikes into the lawn and upon movement of the spikes over the lawn, means for raising and lowering said roller for regulating the depth of penetration of the spikes into the lawn and means for propelling said spikes over the lawn.

7. In a construction as defined in claim 5, means operative on said spikes for moving said spikes horizontally upon their engagement with the lawn for propelling said spiker over the lawn.

8. In a construction as defined in claim 5, said spikes comprising a horizontally extending row of generally vertically positioned pairs of spikes, the spikes of each pair being spaced apart at their lower ends and provided with a sharpened driving point at their lower ends, means securing the spikes of each pair together at their upper ends for reciprocation of each pair of spikes independently of the pair of spikes adjacent thereto, said means for reciprocating said spikes comprising an elongated crank shaft mounted on the frame for rotation about the horizontal axis of the shaft, said crank shaft having alternately offset cranks and means rotatably securing the upper ends of each pair of spikes to the cranks of the crank shaft respectively, the offset cranks being arranged relatively along the crank shaft to always cause a pair of connected spikes on opposite sides of the center of the row of spikes to simultaneously descend for simultaneously engaging the lawn to substantially prevent veering of the spiker during its movement over the lawn.

9. A lawn spiker comprising a frame including ground wheels for supporting said frame for rolling over a lawn in one normal direction, a plurality of generally vertical spikes on the frame having sharpened lower ends, means for driving said spikes generally vertically downwardly into the lawn and for withdrawing said spikes generally vertically upwardly therefrom in a direction substantially lengthwise of the spikes, and fulcrum means slidably engaging the spikes at a point spaced from their lower ends, the means for driving and withdrawing the spikes being adapted to coact with said fulcrum means to cause the lower ends of the spikes to move generally horizontally in a direction opposite to the normal directional movement of the spiker and at substantially the normal rate of speed of the spiker whereby holes will be punched in the lawn without tearing up the sod.

JOHN F. ARCHIBALD.